(12) United States Patent
Pilipetskii et al.

(10) Patent No.: US 10,454,611 B2
(45) Date of Patent: Oct. 22, 2019

(54) SPATIAL DIVISION MULTIPLEXING IN LIMITED POWER OPTICAL COMMUNICATION SYSTEMS

(71) Applicant: SubCom, LLC, Eatontown, NJ (US)

(72) Inventors: Alexei Pilipetskii, Colts Neck, NJ (US); Oleg V. Sinkin, Long Branch, NJ (US); Georg Mohs, East Brunswick, NJ (US); Hussam G. Batshon, Neptune, NJ (US); Neal S. Bergano, Lincroft, NJ (US)

(73) Assignee: Subcom, LLC, Eatontown, NJ (US)

( * ) Notice: Subject to any disclaimer, the term of this patent is extended or adjusted under 35 U.S.C. 154(b) by 0 days.

(21) Appl. No.: 15/347,957

(22) Filed: Nov. 10, 2016

(65) Prior Publication Data

US 2017/0063467 A1 Mar. 2, 2017

Related U.S. Application Data

(63) Continuation of application No. 14/480,929, filed on Sep. 9, 2014, now Pat. No. 9,503,197.

(51) Int. Cl.
*H04J 14/02* (2006.01)
*H04J 14/04* (2006.01)
*H04B 10/2581* (2013.01)

(52) U.S. Cl.
CPC .......... *H04J 14/04* (2013.01); *H04B 10/2581* (2013.01); *H04J 14/0221* (2013.01)

(58) Field of Classification Search
CPC .... H04B 10/2581; H04J 14/04; H04J 14/0221
See application file for complete search history.

(56) References Cited

U.S. PATENT DOCUMENTS

| 2007/0058984 A1 | 3/2007 | Charlet |
| 2011/0274435 A1 | 11/2011 | Fini |

(Continued)

FOREIGN PATENT DOCUMENTS

| JP | 2008514056 A | 5/2008 |
| WO | 2005094321 | 10/2005 |
| WO | 2013033703 A1 | 3/2013 |

OTHER PUBLICATIONS

Krummrich, Spatial multiplexing for high capacity transport (published in Optical Fiber Technology, vol. 17, pp. 480-489, 2011).*

(Continued)

*Primary Examiner* — Casey L Kretzer

(57) ABSTRACT

This spatial division multiplexing (SDM) in power-limited optical communication systems. In general, an SDM optical transmission system may be configured to increase data capacity over the data capacity of a non-SDM optical transmission system while maintaining power consumption at or below that of the existing non-SDM optical transmission system. To realize such an improvement in performance without increasing power consumption, an example SDM optical transmission may be constructed by reducing system bandwidth, reducing and/or altering equipment for filtering, reducing optical amplifier spacing, reducing operational amplifier power consumption, etc. In this manner, increased data transmission performance may be realized even where available power may be strictly limited.

18 Claims, 9 Drawing Sheets

(56) References Cited

U.S. PATENT DOCUMENTS

2012/0294607 A1  11/2012  Winzer et al.
2013/0209106 A1  8/2013  Mukasa
2015/0171964 A1* 6/2015  Rapp .................. H04J 14/00
                                                  398/58
2015/0229438 A1  8/2015  Le Taillandier De Gabory et al.

OTHER PUBLICATIONS

Krummrich, "Spatial Multiplexing for High Capacity Transport," Optical Fiber Technology (2011) 17:480-489.
Doran et al., "Minimising Total Energy Requirements in Amplified Links by Optimising Amplifier Spacing," Optics Express (2014) 8 pages.
Krummrich "Optical Amplification for Capacity Increase in Long Haul Transmission Systems by Spatial Multiplexing," Photonics Conference (2011) 2 pages.
Takahashi et al., "First Demonstration of MC-EDFA-Repeatered SDM Transmission of 40 x 128-Gbit/s PDM-QPSK Signals Per Core Over 6, 160-km 7-Core MCF," Optical Express (2013) 3 pages.
International Search Report dated Nov. 20, 2015 received in counterpart PCT Application No. PCT/US2015/048286.
Sakaguchi, et al., "19-core MCF transmission system using EDFA with shared core pumping coupled via free-space pptics," Optics Express, Jan. 13, 2014, vol. 22, No. 1, pp. 91-95.

* cited by examiner

SPATIAL DIVISION MULTIPLEXING IN LIMITED POWER OPTICAL COMMUNICATION SYSTEMS

CROSS REFERENCE TO RELATED APPLICATIONS

This application is a continuation application of U.S. patent application Ser. No. 14/480,929 filed Sep. 9, 2014, the entire disclosure of which is hereby incorporated herein by reference.

TECHNICAL FIELD

The present disclosure relates to optical communication systems, and more specifically, to spatial division multiplexing in limited power optical communication systems.

BACKGROUND

In wavelength division multiplexing (WDM) optical communication systems a single optical fiber may be used to carry multiple optical signals. The multiple optical signals are multiplexed to form a multiplexed signal or WDM signal with each of the multiple signals being modulated on separate channels. Each channel may be at an associated wavelength that is separated from adjacent channels by a defined channel-spacing, e.g. according to a channel plan established by the International Telecommunications Union (ITU). The range of wavelengths that may be transmitted on the system is known as the system bandwidth. Systems may utilize their system bandwidth to carry a desired number of channels with desired modulation format and bit rate.

To satisfy increasing demand for transmission capacity in optical transmission systems, spectral efficiency has been increased using a number of techniques. Multi-level modulation techniques and coherent receivers have been used, for example, to allow increased transmission rates and decreased channel spacing, thereby increasing the spectral efficiency (SE) of each channel in a WDM system. In a multi-level modulation format, such as a quadrature amplitude modulation (QAM) format, multiple data bits are encoded on a single transmitted symbol.

While use of multi-level modulation formats may increase spectral efficiency and transmission capacity, such formats may require increased signal-to-noise ratio (SNR). Operating with high SNR requires high optical channel output power and high amplifier pump power, especially for wide system bandwidths. Delivering the required high power levels can present a significant technical and economic challenge, in particular, in undersea systems where the electrical power for the entire cable must be transported along the cable. In this scenario, the ability to realize increased performance may be impeded by a limited amount of available power.

One potential approach to increasing spectral efficiency is to implement spatial division multiplexing (SDM). In an SDM system, a multi-dimensional fiber, e.g. a multi-core or multi-mode fiber, may be used, and the WDM signal may be separated onto each of the dimensions of the fiber. For example, instead of transmitting a WDM signal on a single core fiber, in an SDM system the signal may be separated and transmitted on each of the cores of a multi-core fiber.

Unfortunately, in long-haul SDM systems each of the dimensions, e.g. cores, of the transmission fiber must be amplified. The optical pump power required to pump each of the dimensions of a multi-dimensional fiber may not be available in a power-limited system.

BRIEF DESCRIPTION OF THE DRAWINGS

Reference should be made to the following detailed description which should be read in conjunction with the following figures, wherein like numerals represent like parts.

Although the following Detailed Description will proceed with reference being made to illustrative embodiments, many alternatives, modifications and variations thereof will be apparent to those skilled in the art.

DETAILED DESCRIPTION

This disclosure is directed to spatial division multiplexing (SDM) in limited power optical communication systems. In general, methods consistent with the present disclosure include methods of configuring an SDM optical transmission system to provide increased transmission capacity compared to the data capacity of a non-SDM optical transmission system while maintaining power consumption at or below that of the non-SDM optical transmission system.

Figure 1:
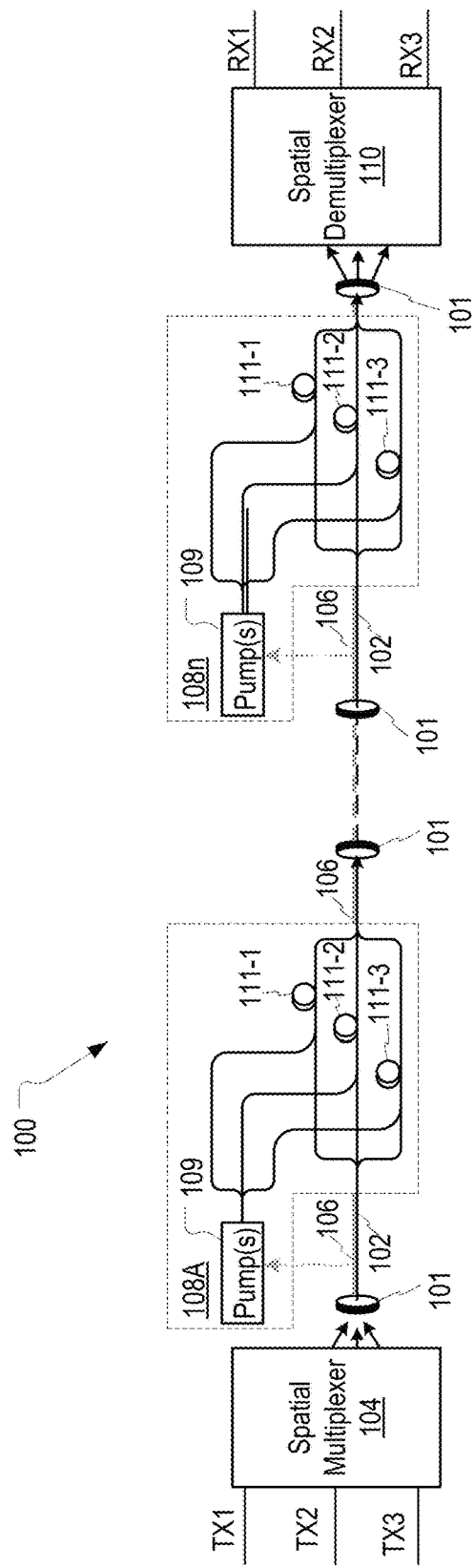
FIG. 1 illustrates an example space-division multiplexing (SDM) optical transmission system consistent with the present disclosure.

FIG. 1 illustrates an example SDM optical transmission system consistent with the present disclosure. Initially, it is important to distinguish what has been termed herein as a non-SDM optical transmission system as compared to an SDM optical transmission system as set forth in FIG. 1. A "non-SDM" optical transmission system as referred to herein means a system configured for transmitting optical signals on an optical cable including one or more a single mode optical fibers (SMFs) having only one core. The non-SDM system may be a long-haul submarine system configured for transmitting signals from a transmitter to a receiver at a distance of 5,000 km, or more, and may be power-limited. The term "power-limited" as used herein refers to system wherein the power delivered to the power conductor of the optical cable is limited by configuration (e.g., composition, diameter, length, etc.) of the cable. Increasing the total power delivered to a power-limited system to support substantially increased total SNR may not be possible without jeopardizing the integrity of the power conductor and/or the power source.

The illustrated SDM system 100 includes optical cable 101, a spatial multiplexer 104, optical amplifiers 108 . . . 108n and spatial demultiplexer 110. The system serves to transmit optical signals over the optical cable 101 in the direction from the spatial multiplexer 104 to the spatial demultiplexer 110. The exemplary system 100 may be a long-haul submarine system configured for transmitting the channels over a distance of 5,000 km, or more.

Those skilled in the art will recognize that the system 100 has been depicted as a highly simplified point-to-point system for ease of explanation. For example, the system 100 is illustrated as transmitting in a single direction from the spatial multiplexer 104 to the spatial demultiplexer 110. The system may, of course, be configured for bi-directional communication and/or may be configured as a branched network. It is to be understood that a system and method consistent with the disclosure may be incorporated into a wide variety of network configurations. The illustrated exemplary embodiments herein are provided only by way of explanation, not of limitation.

The optical cable 101 includes at least one optical fiber 102 and includes a plurality of dimensions. As used herein the term "dimension" refers to distinguishable optical data pathway. For example, a single mode and single core optical fiber has only one dimension. A multi-core fiber has a number of dimensions equal to the number of cores in the fiber, since each core can support an associated dimension. A multi-mode fiber or few-mode fiber has a number of dimensions equal to the modes supported by the fiber. Also, a bundle of single mode, single-core fibers also has multiple dimensions, each of which is supported by a distinct one of the fibers. An SDM system consistent with the present disclosure may include any number of multi-dimensional optical fibers of any type. For ease of explanation, the illustrated embodiment is shown as including a single multi-core optical fiber 102 having three cores.

The optical cable 101 includes a power conductor 106 designed to convey electrical power to the optical amplifiers 108 . . . 108n, optical add-drop-multiplexers (etc.), etc. coupled to optical cable 101. The configuration of the power conductor 102 may be common in undersea optical transmission systems where power must be carried along the run of optical cable 101 with the power being supplied from either or both ends of optical cable 101. The system 100 is a power-limited system.

The spatial multiplexer 104 may be configured to receive modulated optical signals TX1, TX2 and TX3 and multiplex the signals TX1, TX2 and TX3 onto the separate spatial dimensions of the optical fiber 102. For a multi-core fiber, for example, the spatial multiplexer 104 may combine the optical signals TX1, TX2 and TX3 onto separate cores of the fiber, and for a multi-mode or few-mode fiber the spatial multiplexer 104 may be configured to combine the signals in a manner that provides them on the different modes of the optical fiber.

The optical amplifiers 108 . . . 108n may be coupled to optical cable 101 at a set spacing. An example of optical amplifier 108 is an erbium-doped fiber amplifier (EDFA), which may comprise a plurality of pumps 109, e.g. laser diodes, and a pump manifold to couple the pumps to associated sections 111-1, 111-2, 111-3 of erbium-doped fiber. The separate sections 111-1, 111-2, 111-3 of erbium-doped fiber, respectively, may be coupled to different ones of the optical cores in a multi-core fiber, e.g. the number of sections 111-1, 111-2, 111-3 may be equal to the number of cores, or may be coupled to the modes in multi-mode or few-mode fiber. When the separate sections of erbium-doped fiber 111-1, 111-2, 111-3 are pumped by their associated pumps 109, the signals propagating in the different spatial dimensions of the optical fiber 102 are amplified via stimulated emission.

The amplified signal may then continue propagating within the optical fiber 102, being amplified periodically along the way, until received by the spatial demultiplexer 110. The spatial demultiplexer 110 may reverse the multiplexing originally applied by the spatial multiplexer 102 to provide received signals RX1, RX2 and RX3 corresponding to the original signals TX1, TX2 and TX3, respectively.

In the system 100 the power required to pump the different spatial dimensions in each of the amplifiers 108 . . . 108n is significantly higher than the power required to pump a single-mode, single-core fiber in a non-SDM system, but the system 100 may have the same power limitations as a non-SDM system. Accordingly, the power to pump the different spatial dimensions in the system 100 may not be available using a conventional non-SDM system design. Consistent with the present disclosure, therefore, the SDM system 100 is modified compared to conventional non-SDM system configurations to provide power for supporting, e.g. pumping, the different spatial dimensions while maintaining power consumption at or below that of the non-SDM optical transmission system and providing increased transmission capacity compared to the capacity of the non-SDM optical transmission system For example, in a system consistent with the present disclosure, power for supporting, e.g. pumping, the spatial dimensions in the SDM system may be obtained by reducing the system bandwidth compared to a non-SDM system. Non-SDM power-limited optical transmission systems may operate based on the principle that the larger the system bandwidth, the larger the transmission capacity. To support large bandwidth transmission, the optical amplifiers are pumped to provide amplification across the entire system bandwidth. Unfortunately, however, gain imparted by an EDFA across a large bandwidth is uneven and after successive amplification some signals within the bandwidth may be lost due to noise associated with the amplifiers. To avoid this, a gain-flatting filter (GFF) may be used within each optical amplifier to flatten the gain across the system bandwidth. Each GFF, however, attenuates the signal in at least some portion of the system bandwidth.

Figure 2:
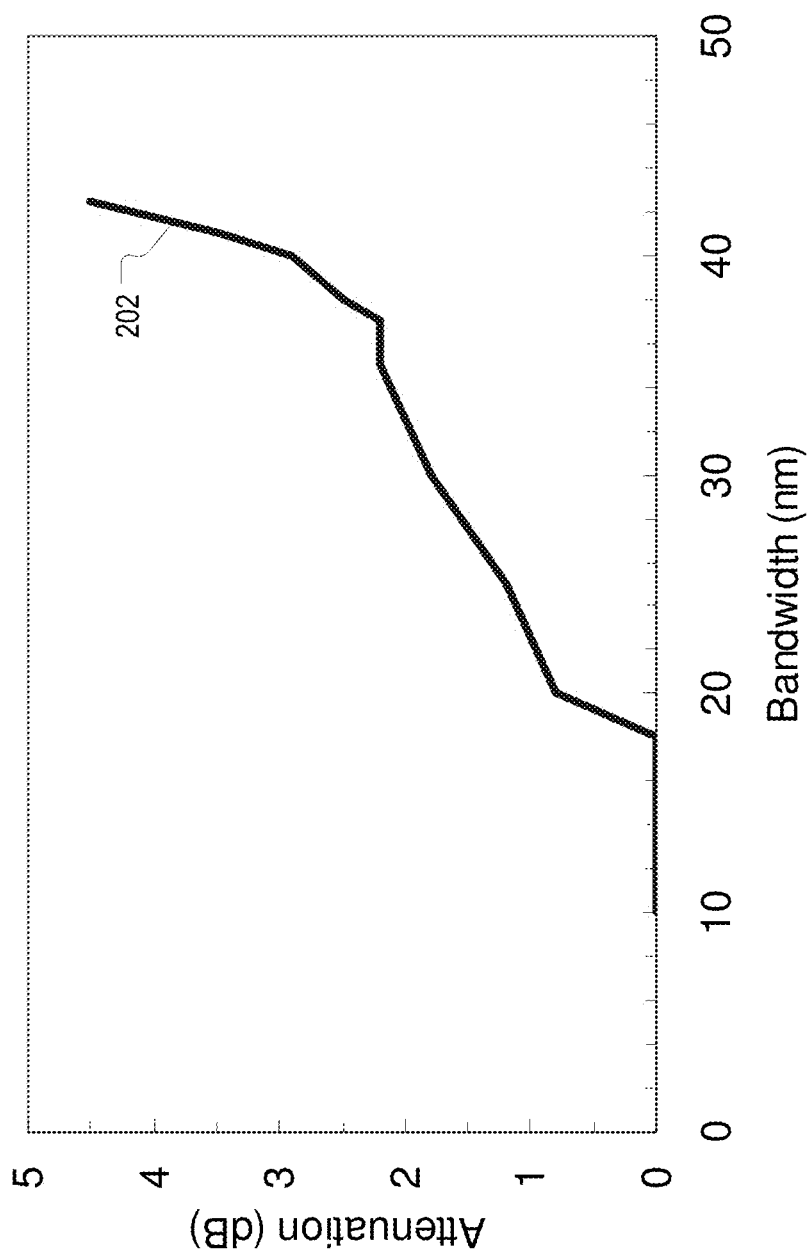
FIG. 2 is a plot of attenuation vs. bandwidth illustrating an example relationship between attenuation and bandwidth associated with a gain-flattening filter (GFF) consistent with the present disclosure.

FIG. 2 includes a plot 202 of attenuation associated with a GFF vs. system bandwidth. The system bandwidth is the bandwidth that encompasses all of the wavelengths on which data may be communicated in the system. Plot 202 demonstrates that as system bandwidth becomes wider, increased attenuation is imparted by the GFF to equalize the erbium gain. At certain bandwidths the GFF is unnecessary and there is a drop in attenuation of ~0.8 dB at 20 nm associated with the removal of the GFF. This trend is generally true for any type of optical amplifier 108 ... 108n.

Consistent with the present disclosure therefore, the system bandwidth at which system 100 may be designed to operate may be reduced compared to a typical non-SDM system. This reduction in system bandwidth allows a corresponding reduction, or removal, of the attenuation imparted by the GFFs. Reducing or removing the attenuation imparted by GFFs reduces the overall power consumption in system 100. The conserved power may then be utilized to pump multiple spatial dimensions of the SDM system.

As the system bandwidth is reduced compared to a non-SDM system, the number of dimensions in the SDM system may be increased proportionally to make up for the capacity decrease associated with the reduced bandwidth. However, to increase the total capacity based on the limited available power the number of dimensions may only be increased in proportion to the saved power. In general, the total capacity increase of the SDM system compared to the non-SDM system, ΔC, is proportional to the power savings achieved by reducing the bandwidth and GFF attenuation, which is inversely proportional to the attenuation of the GFF, αGFF:

$$\Delta C = \alpha GFF(B_1)/\alpha GFF(B_0), \quad (1)$$

wherein $B_0$ is a starting (e.g., wider) system bandwidth associated with a non-SDM system, and $B_1$ is a desired (e.g., narrower) system bandwidth associated with the SDM system 100. The required number of spatial dimensions in the SDM system, Δn, may then be increased based on the relationship:

$$\Delta n = (B_1/B_0) \cdot \alpha_{GFF}(B_1)/\alpha_{GFF}(B_0) \quad (2)$$

Figure 3:
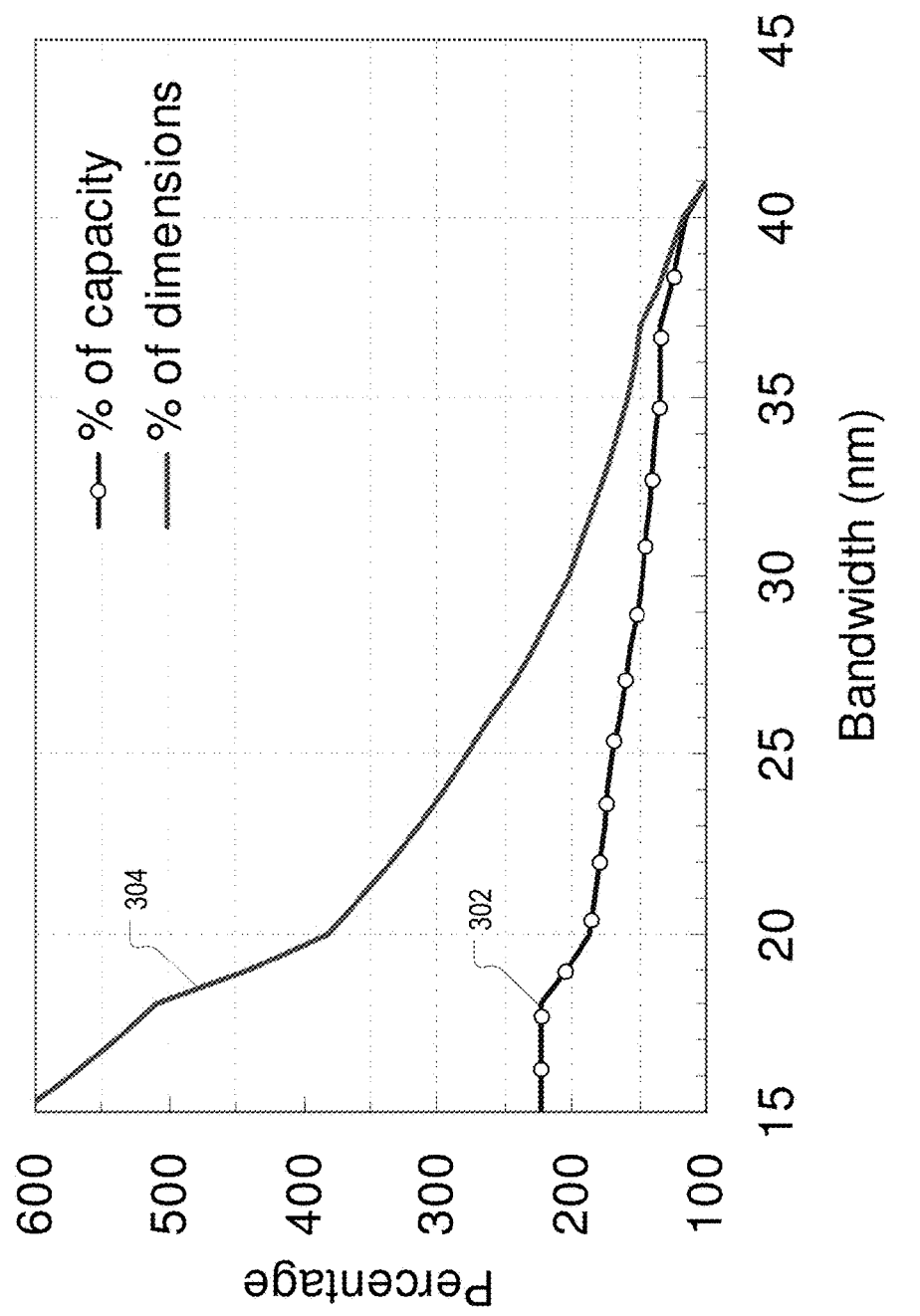
FIG. 3 includes plots of percentage capacity and spatial dimension increase vs. system bandwidth illustrating an example of how reducing system bandwidth increases capacity in an SDM optical transmission system consistent with the present disclosure.

FIG. 3 includes plots 302, 304 of capacity increase, ΔC, and spatial dimensional, Δn, increase vs. system bandwidth illustrating how reducing system bandwidth and attenuation imparted by GFFs in optical amplifiers, as shown in FIG. 2, increases capacity in an SDM optical transmission system consistent with the present disclosure compared to a non-SDM system. In particular, plot 302 is a plot of capacity increase, ΔC, vs. system bandwidth and plot 304 is a plot spatial dimensional, Δn, increase vs. system bandwidth. Plots 302 and 304 illustrate the change in capacity ΔC and the change in spatial dimensions Δn, respectively, as a percentage relative to $B_0$=41 nm. The bandwidth axis corresponds to $B_1$ in equation (2).

As shown, at 41 nm the capacity and spatial dimensions are both 100%. With reference to plot 302, as the bandwidth $B_1$ is reduced conserved power associated with reduced attenuation imparted by the GFF needed to flatten the gain across the bandwidth allows the capacity to grow up to 200% at a bandwidth $B_1$ of 19-20 nm. Plot 304 shows that reducing the bandwidth to achieve a 200% capacity increase requires a ~400% increase (four times) in the number of spatial dimensions. For the exemplary system represented by plots 302 and 304, therefore, a 200% capacity increase can be achieved in a SDM system compared to a non-SDM system while keeping total power consumption constant by reducing the system bandwidth from 41 nm to 19-20 nm, providing four times the number of dimensions in the SDM system compared to the non-SDM system, and modifying the GFF in the optical amplifiers to provide flattening of the reduced system bandwidth to thereby reduce the attenuation imparted by the GFF, e.g. as shown in FIG. 2. Also, a capacity increase of at 150% or more can be achieved by setting the system bandwidth to 30 nm or less and using two dimensions in the SDM system.

It is important to note that while plots 302 and 304 in FIG. 3 are based on a particular relationship of GFF attenuation versus bandwidth such as illustrated in plot 202 in FIG. 2, typical shapes will be similar with the same overall trend: power savings from reducing system bandwidth and attenuation imparted by GFFs may be used to pump additional spatial dimensions in a SDM system to thereby achieve increased system capacity under fixed power consumption. While in general a simple linear dependence may be deemed to exist between amplifier output power and pump power, excited state absorption may reduce the efficiency of pump power conversion for high-power amplifiers. Therefore, the benefit of reducing system bandwidth, and hence the output power of optical amplifiers 108 ... 108n, may result in larger than linear power savings.

Any residual gain shape variation resulting from reducing system bandwidth and removing or changing the shape of a GFF in an amplifier 108 ... 108n compared to the bandwidth and shape of a GFF in a non-SDM system may be corrected with gain correction filters placed periodically along optical cable 101, e.g. on the order of every ten spans of optical cable 101. Gain correction filters are typically used in a non-SDM system even if the GFFs are present in every optical amplifier 108 ... 108n. Gain correction filters are thus already accounted for in the total power usage of system 100.

Figure 4:
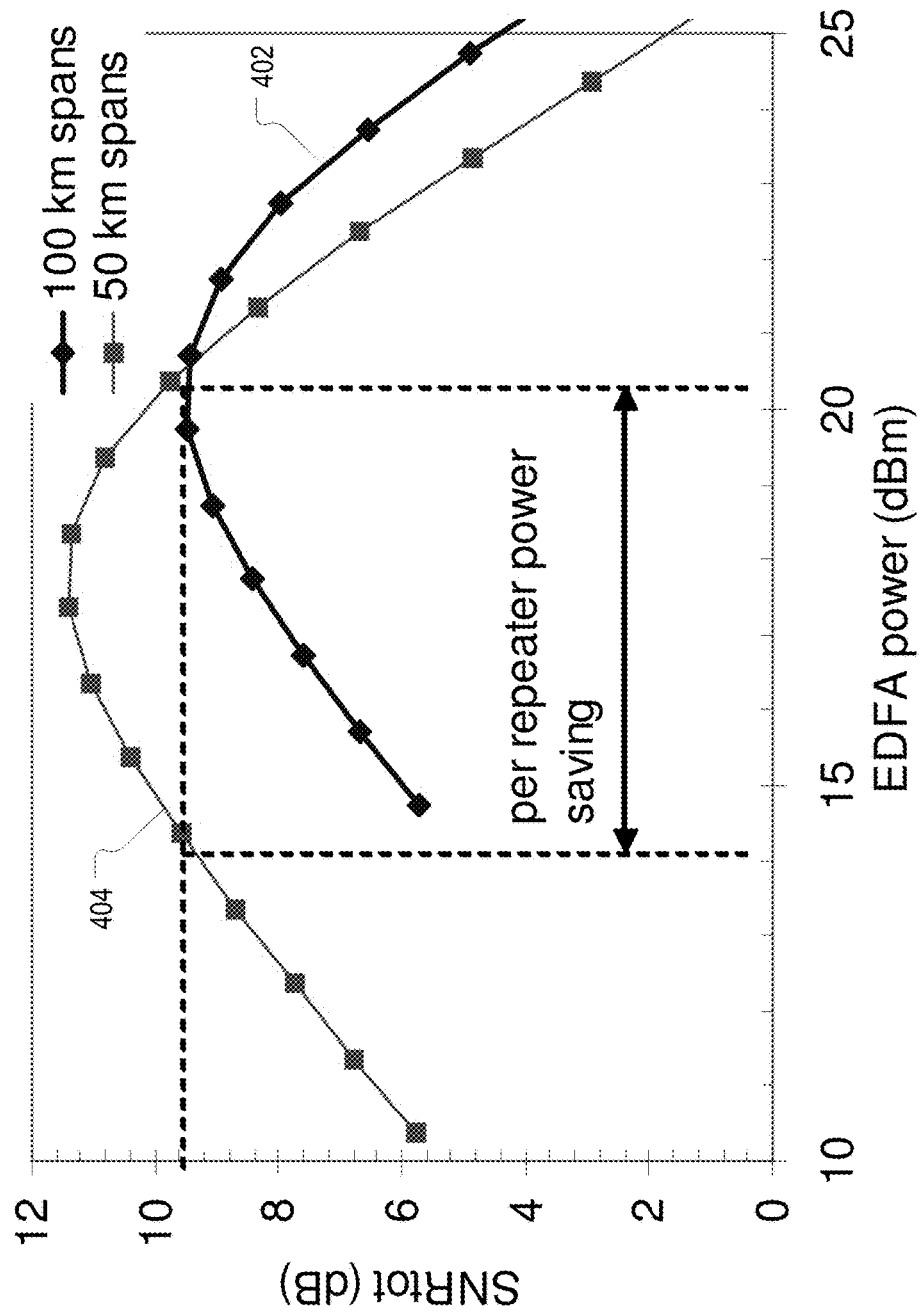
FIG. 4 includes plots of total SNR vs. erbium-doped fiber amplifier (EDFA) power illustrating an example of how decreasing optical amplifier spacing decreases power consumption in an SDM optical transmission system consistent with the present disclosure.

Consistent with the present disclosure, an additional or alternative approach for modifying an SDM system 100 compared to a conventional non-SDM system to save power for supporting, e.g. pumping, the different spatial dimensions in the SDM system involves reducing amplifier spacing in the SDM system 100 compared to the non-SDM system. FIG. 4, for example, includes plots 402, 404 of total SNR ($SNR_{tot}$) vs. EDFA power illustrating an example of how decreasing optical amplifier spacing saves power in an SDM system that may be used to pump the different spatial dimensions. In the following disclosure, the term "repeater" may be employed to refer to "optical amplifiers 108 ... 108n" as set forth above.

Amplified spontaneous emission (ASE) noise at the end of a periodically amplified homogeneous link may be approximated by the relationship:

$$P_{ASE} = N_s \cdot (g \cdot nf - 1) \cdot h \cdot v \cdot dv, \quad (3)$$

wherein of is the amplifier noise, $N_s$ is the number of repeated spans, h is the Plank constant, v is frequency and dv is the frequency band in which noise is measured. The gain, g, may be expressed by the equation:

$$g = 10^{0.1 \alpha L_s} \quad (4)$$

wherein Ls is the span length in km and α is the attenuation in dB/km. Combining equations (3) and (4), and assuming a large gain, results in ASE power becoming an increasing function of span length Ls, approximately:

$$P_{ASE} \sim 10^{0.1 \alpha L_s}/L_s \quad (5)$$

In order to maintain the same $SNR_{tot}$ at the end of the link, the signal power must be maintained proportional to amplified spontaneous emission (ASE) power, so that the amplifier power will have same dependence on $L_s$ as $P_{ASE}$ as set forth in the following relationship:

$$P_{Amplifier} \sim 10^{0.1\alpha Ls}/Ls \qquad (6)$$

The above relationship indicates that reducing span length may provide power savings. Saved power may then to be used to support, e.g. pump, additional spatial dimensions for data transmission, increasing the total system capacity. For example, consider a 10,000 km system with a 100 km repeater spacing (e.g., 100 km spans) employing optical cable 101 with the following parameters: fiber effective area=130 μm2, attenuation 0.16 dB/km. Assuming Nyquist signaling (i.e., channel spacing=symbol rate, rectangular channels) and a receiver with built in signal-to-noise degradation of approximately 1 dB to represent practical hardware performance, a Gaussian Noise (GN) method may be utilized to evaluate performance. Total signal-to-noise ratio ($SNR_{tot}$) may be utilized as a measure of performance, wherein $SNR_{tot}$ may be defined by the following relationship:

$$SNR_{tot} = P_{signal}/(P_{ASE} + P_{NLI}), \qquad (7)$$

wherein $P_{signal}$ is the signal power, $P_{ASE}$ is the ASE power and $P_{NLI}$ is the nonlinear interference noise power.

Plot 402 in FIG. 4 is a plot of $SNR_{tot}$ vs. EDFA power for the example system based on equation (7). The example system was designed to have optimum performance with 100 km spans and amplifier power of ~20 dBm. For comparison, plot 404 in FIG. 4 is a plot of $SNR_{tot}$ vs. EDFA power for the system with the same total transmission distance but using 50 km repeater spacing (e.g., 50 km spans). The per repeater power saving achieved by reducing the spacing from 100 km to 50 km is ~6 dBm. Since the number of repeaters in the 50 km span example was doubled based on the decrease in repeater spacing, the total optical power savings in the system is ~3 dB, which directly translates into additional fiber capacity if this power is used to support (e.g. pump) additional spatial dimensions.

Figure 5:
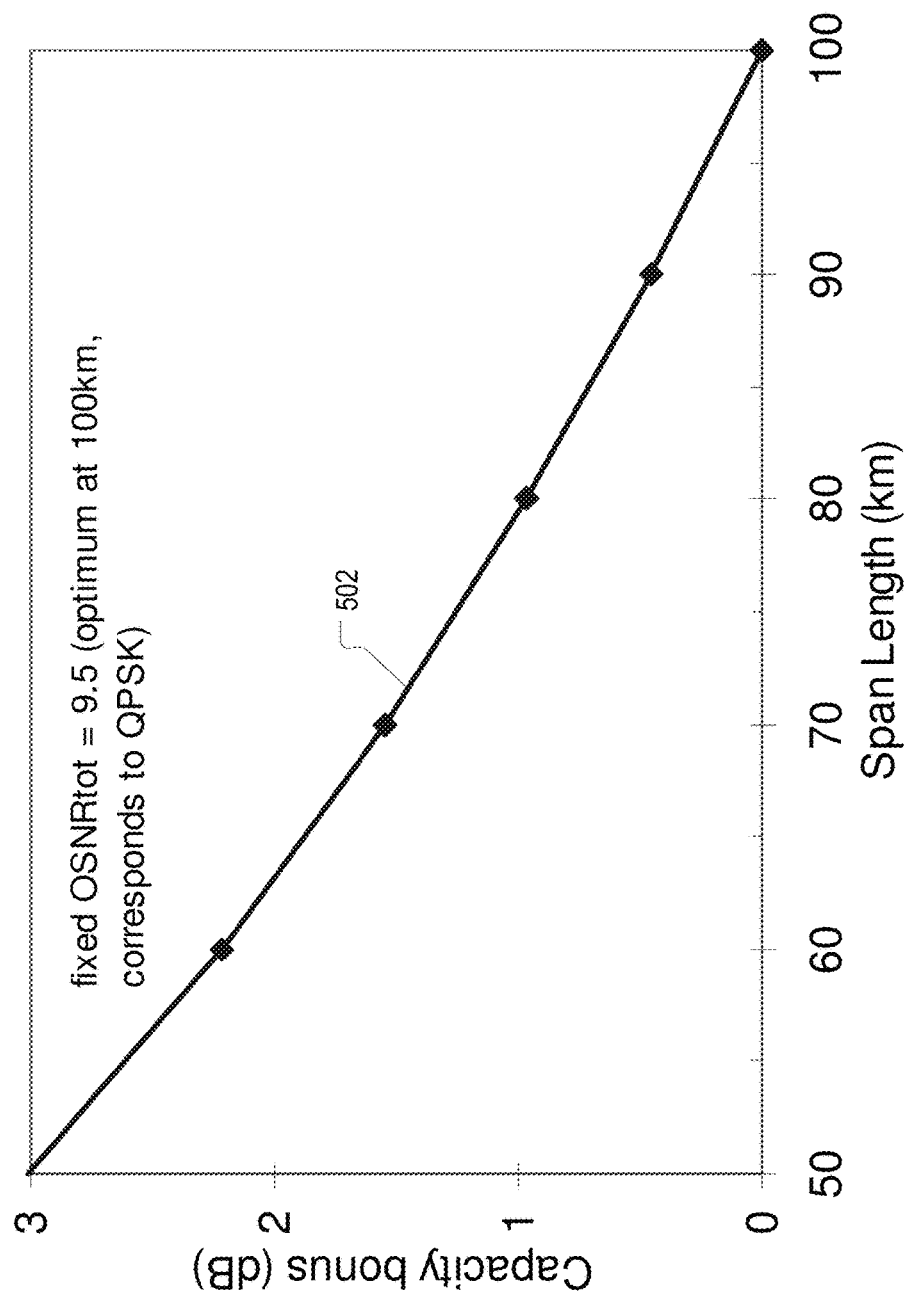
FIG. 5 includes a plot of capacity bonus vs span length illustrating an example of how decreasing optical amplifier spacing increases capacity in an SDM optical transmission system consistent with the present disclosure.

FIG. 5 illustrates includes a plot 502 of capacity bonus vs. span length illustrating how decreasing optical amplifier spacing compared to a non-SDM system increases capacity in an SDM optical transmission system consistent with the present disclosure. Plot 502 shows the total capacity benefit from shortening repeater spacing from 100 km spans used in a non-SDM system to a 50 km spans for use in an SDM system. As shown, power savings realized by shortening receiver spacing an SDM system compared to conventional non-SDM system may be used to pump additional spatial dimensions in the SDM system to thereby achieve increased system capacity.

Figures 6A, 6B:
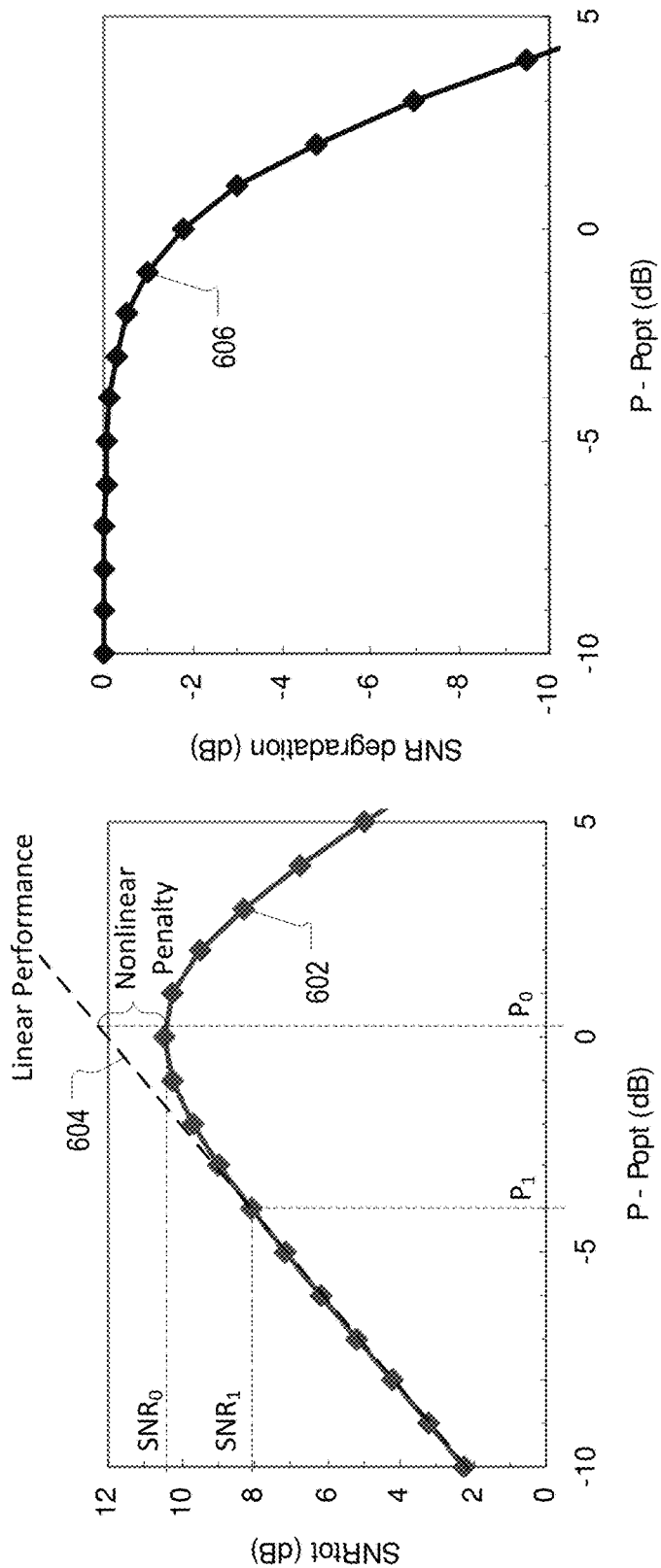
FIG. 6A includes plots of total SNR vs. the difference between power and optimal power (P-Popt) illustrating an example of how power per spatial dimension may be reduced in an SDM system consistent with the present disclosure compared to optimal system power to provide power savings to support the spatial dimensions.
FIG. 6B includes plots of nonlinear penalty vs. the difference between power and optimal power (P-Popt) illustrating an example of how non-linear penalty may be reduced in an SDM system consistent with the present disclosure to provide power savings to support the spatial dimensions.

Consistent with the present disclosure, an additional or alternative approach for modifying an SDM system 100 compared to a conventional non-SDM system to save power for supporting, e.g. pumping, the different spatial dimensions in the SDM system involves configuring the SDM system to operate at less than peak performance. A typical transmission system may be designed to operate at or near the peak of the performance, which may be determined based on the interplay between ASE noise accumulation and nonlinear interference noise. FIG. 6A includes a plots 602 and 604 of $SNR_{tot}$ vs. signal power (P) relative to optimum signal power (Popt), i.e. P-Popt. Plot 602 is a typical performance curve for a simulated non-SDM system and plot 604 is a plot illustrating simulated linear performance of the non-SDM system, i.e. performance of the system if the system did not produce nonlinear interference (NLI) noise. In plot 602, $SNR_{tot}$ is utilized as a measure of performance including both ASE and NLI noise as set forth in the following equation:

$$SNR_{tot} = \frac{P_{sig}}{P_{ASE} + P_{NLI}} = \frac{P_{sig}}{P_{ASE} + \eta P_{sig}^3}, \qquad (8)$$

where Psig is the signal power, PASE is the power in the ASE noise, and PNLI is the power in the NLI noise, η is a parameter indicating the impact of non-linearities in the system. In plot 602 a fixed $P_{ASE}$ and η are set, which corresponds to a particular system with a fixed set parameters, wherein signal power $P_{sig}$ is then varied to find the optimum $SNR_{tot}$. In plot 602 the optimum $SNR_{tot}$, indicated as $SNR_0$, is achieved at $P_0$. The difference between plot 604 (linear performance) and plot 602 at $P_0$ is the non-linear penalty imparted in the system as a result of operating the system at $P_0$.

In at least one embodiment consistent with the present disclosure, operating power per spatial dimension may be reduced to move away from the nonlinear part of the performance curve (plot 602) towards the linear part. For example, as illustrated in FIG. 6A the operating power per spatial dimension may be moved from the optimal power $P_0$ at which the optimal $SNR_{tot}$, i.e. $SNR_0$, is achieved to $P_1$ at which a sub-optimal $SNR_{tot}$, i.e. $SNR_1$, is achieved. FIG. 6B includes a plot 606 of nonlinear penalty vs. P-$P_{opt}$ associated with plot 602 in FIG. 6A. As shown, setting the P-$P_{opt}$ at less than about −3 db results in a negligible non-linear penalty and produces a savings in system power.

The saved power may then be used to support transmission over additional spatial dimensions, each of the spatial dimensions having lower power and lower spectral efficiency than optimal power $P_0$ and spectral efficiency of a non-SDM system. Lower spectral efficiency results from a reduction in $SNR_{tot}$ according to Shannon's theory for error-free transmission. Overall, a capacity increase, κ, for an SDM system compared to a non-SDM system with optimal performance may be observed per the following equation:

$$\kappa = N_{dim}\frac{C_1}{C_0} = \frac{P_0}{P_1}\frac{SE_1}{SE_0} = \frac{P_0}{P_1}\frac{\log_2(1+SNR_1)}{\log_2(1+SNR_0)}, \qquad (9)$$

wherein $M_{dim}$ is the number of spatial dimensions in the SDM system, $P_0$ is the power setting for the non-SDM system, $P_1$ is the power per dimension in the SDM system, $SE_1$ is the spectral efficiency of the SDM system, $S_0$ is the spectral efficiency of the non-SDM system, $SNR_1$ is the $SNR_{tot}$ for the SDM system and $SNR_0$ is the $SNR_{tot}$ for the non-SDM system.

Figures 7A, 7B:
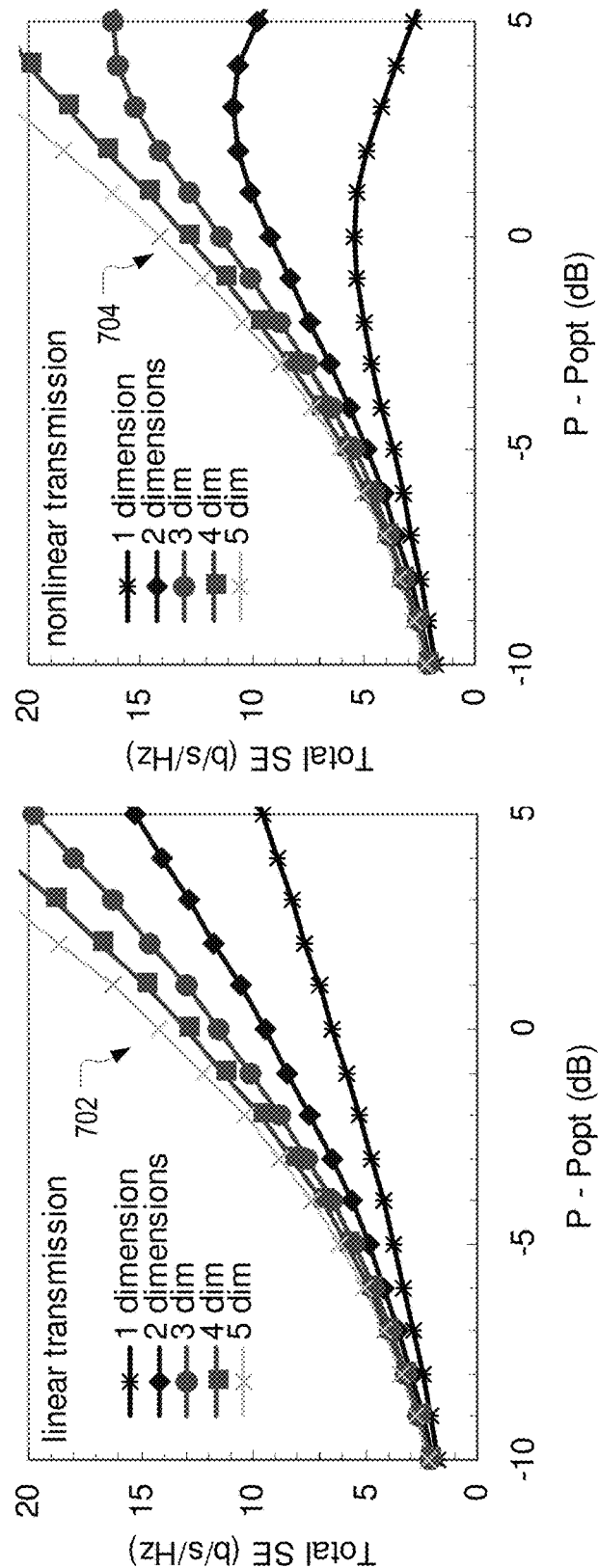
FIGS. 7A and 7B include plots of total spectral efficiency vs. the difference between power and optimal power (P-Popt) for linear and nonlinear transmission, respectively, illustrating spectral efficiency increase achieved by reducing per-dimension power from the optimal power associated with a non-SDM system for optical fibers having a different number of dimensions in an SDM optical transmission system consistent with the present disclosure.

FIG. 7A includes plots 702 of total spectral efficiency vs. P-$P_{opt}$ associated with a simulated SDM system operating in a linear transmission mode, e.g. consistent with plot 604 in FIG. 6A. FIG. 7B includes plots 704 of total spectral efficiency vs. P-$P_{opt}$ associated with the simulated SDM system operating in a nonlinear transmission mode, e.g. consistent with plot 602 in FIG. 6A. The plots 702 and 704 include plots associated with different numbers of spatial dimensions in the SDM system as indicated in the legends associated with FIGS. 7A and 7B.

In the plots 702 the benefit from an increased number of spatial dimensions is described above by equation (9) in terms of $SNR_{tot}$ which includes only ASE noise ($\eta$=0 in Eq. 8). As shown in plots 704 nonlinearites in the system prevent the growth of spectral efficiency with power due to $\eta \neq 0$ in equation (8). However, as the number of dimensions increase, the curves in plot 704 become more similar to the corresponding curves in plot 702. This convergence effectively represents mitigation of the nonlinearity effects by SDM with the indicated number of spatial dimensions.

Figure 8B:
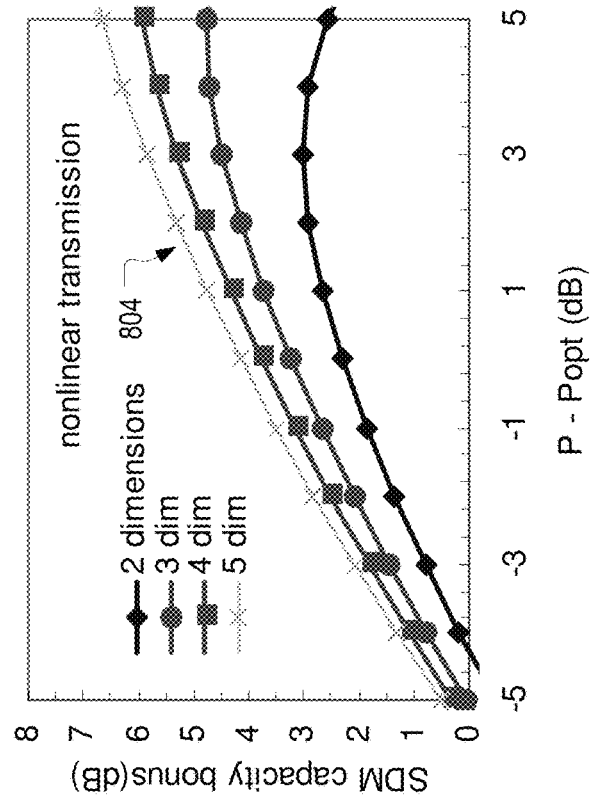
FIGS. 8A and 8B include plots of capacity bonus vs. the difference between power and optimal power (P-Popt) for linear and nonlinear transmission, respectively, illustrating capacity increase achieved by reducing per-dimension power from the optimal power associated with a non-SDM system for optical fibers having a different number of dimensions in an SDM optical transmission system consistent with the present disclosure.
Figure 8A:
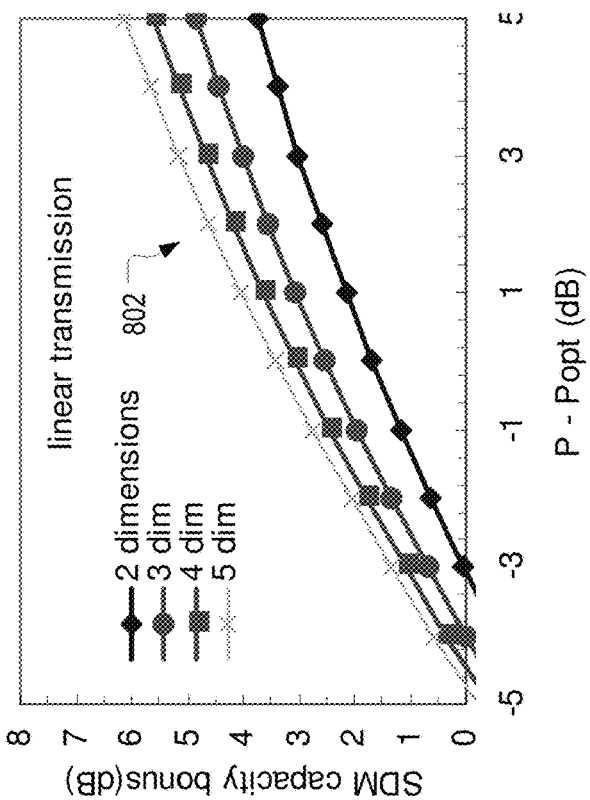

FIG. 8A includes plots 802 of SDM capacity bonus vs. P-$P_{opt}$ associated with a simulated SDM system operating in a linear transmission mode, e.g. consistent with plot 604 in FIG. 6A. FIG. 8B includes plots 804 of SDM capacity bonus vs. P-$P_{opt}$ associated with the simulated SDM system operating in a nonlinear transmission mode, e.g. consistent with plot 602 in FIG. 6A. The plots 802 and 804 include plots associated with different numbers of spatial dimensions in the SDM system as indicated in the legends associated with FIGS. 8A and 8B.

In the plots 802 the capacity bonus from an increased number of spatial dimensions is described above by equation (9) in terms of $SNR_{tot}$ which includes only ASE noise ($\eta$=0 in Eq. 8). As shown in plots 804 nonlinearites in the system prevent the growth of spectral efficiency with power due to $\eta \neq 0$ in equation (8). It is important to note that with a higher number of dimensions in the nonlinear scenario (plots 804) the values of capacity bonus approach levels associated with ideal linear transmission (plots 802). This indicates that the effects of nonlinearity may be mitigated by using a large enough number of dimensions in an SDM system.

Although power-limited systems are utilized as examples herein, there are possible tradeoffs in each particular usage case, and these results serve as guidelines as for what may be expected. With SDM mitigation of nonlinearity, higher capacity can be achieved, in principle, by using higher power, if available, which cannot be done in a single dimension fundamentally. Another important point is that the increase in available power described in reference to FIGS. 7A-B and/or 8A-B may be equivalently viewed as increase in system nonlinearity level, which may also be characterized by fiber-related parameters such as effective area, nonlinear index and dispersion. Thus, the results in FIG. 8 may be interpreted in terms of the fiber design process in favor of reducing the requirements for those critical parameters, which may result in fiber cost reduction or improvement in manufacturability.

Figure 9:
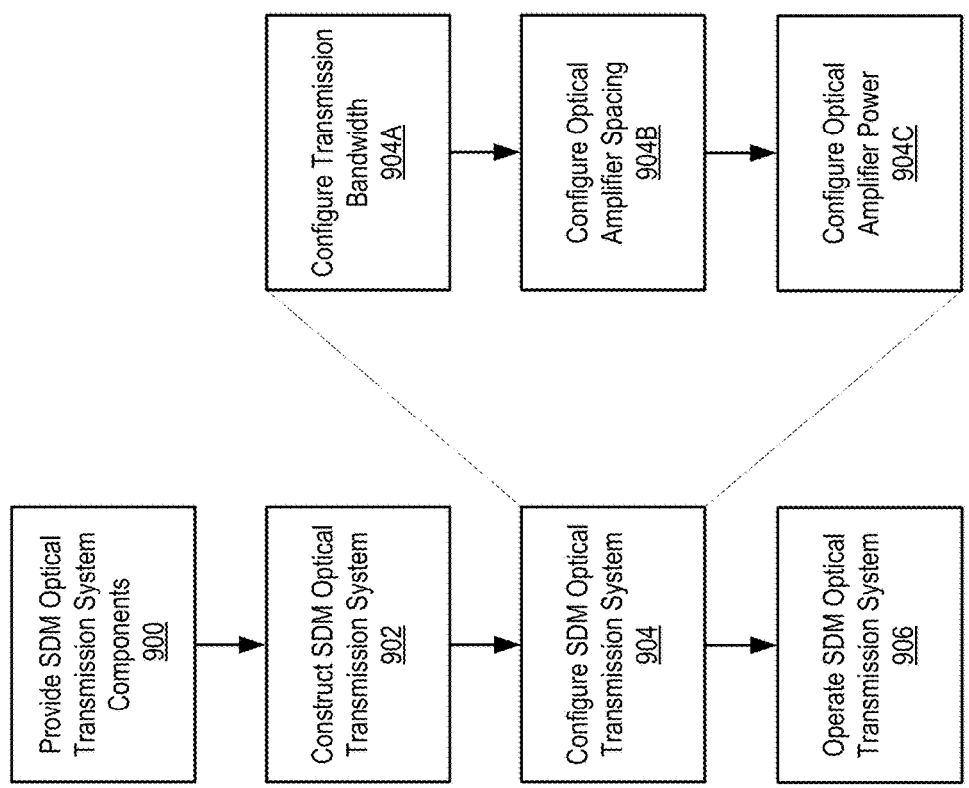
FIG. 9 illustrates example operations for a limited power optical communication system with increased capacity consistent with the present disclosure.

FIG. 9 illustrates example operations for a limited power optical communications with increased capacity consistent with the present disclosure. In operation 900 an SDM optical transmission system may be provided. An SDM optical transmission system may comprise, for example, an optical cable, a spatial multiplexer, a plurality of optical amplifiers and a spatial demultiplexer. The SDM optical transmission system may be constructed in operation 902. In at least one embodiment, the construction of the SDM optical transmission system may comprise the spatial multiplexer, plurality of optical amplifiers and spatial demultiplexer being coupled to the optical cable.

The SDM optical transmission system may then be configured in operation 904. Operations 904A to 904C provide examples of different characteristics that may be configured in the SDM optical transmission system to free up available power (e.g., that may be limited in use cases such as subsea optical communications) for use in supporting additional spatial dimensions that may increase capacity. In operation 904A the system bandwidth of the SDM optical transmission system may be configured (e.g., reduced). In operation 904B the spacing of the plurality of optical amplifiers in the SDM optical transmission system may be configured (e.g., reduced). In operation 904C the power level at which the plurality of optical amplifiers operate may be configured (e.g., reduced). In operation 906 the SDM optical transmission system may be operated, wherein power may be supplied at least to the plurality of optical amplifiers and at least one SDM optical transmission may be generated (e.g., for transmission in the SDM optical transmission system).

While FIG. 9 illustrates various operations according to an embodiment, it is to be understood that not all of the operations depicted in FIG. 9 are necessary for other embodiments. Indeed, it is fully contemplated herein that in other embodiments of the present disclosure, the operations depicted in FIG. 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to limited power optical communications with increased capacity. In general, an SDM optical transmission system may be reconfigured to increase data capacity over the data capacity of an existing non-SDM optical transmission system while maintaining power consumption at or below that of the existing non-SDM optical transmission system. To realize such an improvement in performance without increasing power consumption, an example SDM optical transmission system may utilize an optical cable including a multicore optical fiber over which the total transmission burden may be subdivided, wherein each optical core may be deemed a "dimension." Multidimensional SDM facilitates the additional latitude needed to make modifications such as reducing system bandwidth, reducing and/or altering equipment for filtering, reducing optical amplifier spacing, reducing operational amplifier power consumption, etc. In this manner, increased data transmission performance may be realized even where available power may be strictly limited.

According to one aspect there is provided a method for constructing a space division-multiplexing (SDM) optical transmission system having the same amount of available power as a non-SDM optical transmission system but with a higher transmission capacity per optical fiber, the method including: providing an optical cable having a plurality of spatial dimensions; providing a spatial multiplexer configured to multiplex modulated optical signals on the plurality of spatial dimensions; providing a plurality of optical amplifiers, each of the optical amplifiers being configured for amplifying the plurality of spatial dimensions; providing a spatial demultiplexer; coupling the spatial multiplexer, the plurality of optical amplifiers and the spatial demultiplexer to the optical cable; and configuring the SDM optical transmission system to increase the transmission capacity of the SDM optical transmission system above the transmission capacity of the non-SDM optical transmission system based on the same amount of available power as the non-SDM optical transmission system.

According to another aspect there is provided a method for operating a space division-multiplexing (SDM) optical transmission system having the same amount of available power as a non-SDM optical transmission system but with a higher transmission capacity per optical fiber, the method including: providing an SDM optical system comprising an optical cable having a plurality of spatial dimensions, to which is coupled a spatial multiplexer configured to multiplex modulated optical signals on the plurality of spatial dimensions, a plurality of optical amplifiers, each of the optical amplifiers being configured for amplifying the plurality of spatial dimensions, and a spatial demultiplexer; supplying power to the plurality of optical amplifiers in the SDM optical transmission system, the supplied power being based on an amount of available power in the SDM optical transmission system that is the same as the amount of available power available in the non-SDM optical transmission system; and generating at least one SDM optical transmission in the optical fiber, the at least one SDM optical transmission having a higher transmission capacity per optical fiber than an optical transmission in the non-SDM optical transmission system.

According to another aspect there is provided a method of constructing a power-limited space division-multiplexing (SDM) optical transmission system including: saving power for pumping a plurality of optical amplifiers for amplifying multiple spatial dimensions in the SDM system by: setting a system bandwidth for the SDM system to 30 nm or less, or setting a power level for the plurality of optical amplifiers to a power level less than an optimal power level at which an optimal signal-to-noise ratio is achieved.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of constructing a power-limited space division-multiplexing (SDM) optical transmission system including a plurality of optical amplifiers, the method comprising:
providing a number of spatial dimensions in the SDM optical transmission system, the number of spatial dimensions being two or more;
spacing the plurality of optical amplifiers by an SDM amplifier spacing between the plurality of optical amplifiers to achieve a desired signal-to-noise ratio for the SDM system having the number of spatial dimensions, the SDM spacing being less than a single dimension amplifier spacing, the single dimension amplifier spacing being a spacing between the plurality of optical amplifiers required to achieve the desired signal-to-noise ratio if the SDM system included only a single dimension; and
configuring the plurality of optical amplifiers to provide an associated SDM amplifier power for the plurality of optical amplifiers to achieve the desired signal-to-noise ratio for the SDM system having the number of spatial dimensions, whereby the SDM amplifier power is less than a single dimension amplifier power, the single dimension amplifier power being an amplifier power for the plurality of optical amplifiers required to achieve the desired signal-to-noise ratio if the SDM system included only a single dimension.

2. The method of claim 1, wherein the SDM amplifier spacing is nominally about half of the single dimension amplifier spacing.

3. The method of claim 1, wherein the SDM amplifier spacing is nominally about 50 km and the single dimension amplifier spacing is nominally about T00 km.

4. The method of claim 1, wherein the number of spatial dimensions are provided in an optical cable.

5. The method of claim 4, wherein the optical cable comprises at least one optical fiber having the number of spatial dimensions.

6. The method of claim 4, wherein the optical cable comprises a plurality of optical fibers, each of the plurality of optical fibers providing an associated one of the number of spatial dimensions.

7. The method of claim 1, wherein each of the plurality of optical amplifiers is configured for amplifying the number of spatial dimensions.

8. The method of claim 1 further comprising providing a spatial multiplexer configured to multiplex modulated optical signals on the number of spatial dimensions.

9. The method of claim 1 further comprising providing a spatial demultiplexer configured to demultiplex modulated optical signals from the number of spatial dimensions.

10. A method of saving power for pumping a plurality of optical amplifiers in a power-limited space division-multiplexing (SDM) optical transmission system, the method comprising:

identifying a single dimension amplifier spacing and a single dimension amplifier power for the plurality of optical amplifiers to achieve a desired signal-to-noise ratio when the SDM system has only a single dimension;

providing a number of spatial dimensions in the SDM optical transmission system, the number of spatial dimensions being two or more;

spacing the plurality of optical amplifiers at an SDM amplifier spacing less than the single dimension amplifier spacing; and configuring the plurality of optical amplifiers to have an SDM amplifier power less than the single dimension amplifier power, wherein the SDM amplifier spacing and the SDM amplifier power are selected to achieve the desired signal-to-noise ratio in the SDM system with the number of spatial dimensions.

11. The method of claim 10, wherein the SDM amplifier spacing is nominally about half of the single dimension amplifier spacing.

12. The method of claim 10, wherein the SDM amplifier spacing is nominally about 50 km and the single dimension amplifier spacing is nominally about 100 km.

13. The method of claim 10, wherein the number of spatial dimensions are provided in an optical cable.

14. The method of claim 13, wherein the optical cable comprises at least one optical fiber having the number of spatial dimensions.

15. The method of claim 13, wherein the optical cable comprises a plurality of optical fibers, each of the plurality of optical fibers providing an associated one of the number of spatial dimensions.

16. The method of claim 10, wherein each of the plurality of optical amplifiers is configured for amplifying the number of spatial dimensions.

17. The method of claim 10 further comprising providing a spatial multiplexer configured to multiplex modulated optical signals on the number of spatial dimensions.

18. The method of claim 10 further comprising providing a spatial demultiplexer configured to demultiplex modulated optical signals from the number of spatial dimensions.

* * * * *